United States Patent [19]

Levin

[11] 3,902,970
[45] Sept. 2, 1975

[54] FLOW-THROUGH AMPEROMETRIC MEASURING SYSTEM AND METHOD

[75] Inventor: Herman W. Levin, Philadelphia, Pa.

[73] Assignee: Leeds & Northrup Company, North Wales, Pa.

[22] Filed: July 30, 1973

[21] Appl. No.: 383,855

[52] U.S. Cl. ... 195/103.5 C; 195/103.5 R; 204/1 T; 204/195 R; 204/195 B
[51] Int. Cl. ............................................ G01n 31/14
[58] Field of Search............ 204/195 B, 195 R, 1 T; 195/103.5 R, 103.5 C; 23/230 R, 230 B, 253 R; 324/29

[56] References Cited
UNITED STATES PATENTS

| | | | |
|---|---|---|---|
| 3,367,849 | 2/1968 | Blaedel et al. | 204/1 T |
| 3,519,538 | 7/1970 | Messing et al. | 195/63 |
| 3,676,321 | 7/1972 | Cummings et al. | 204/195 R |

OTHER PUBLICATIONS

H. E. Zittel et al., Analytical Chem., Vol. 37, No. 2, pp. 200–203, Feb. 1965.
Richard A. Durts, "Ion–Selective Electrodes," p. 118, (1969).
M. K. Weibel et al., Analytical Biochemistry, Vol. 52, No. 2, pp. 402–414, (1973).
H. H. Weetall, Biochim. Biophys. Acta., pp. 1–7, Vol. 212, (1970).

Primary Examiner—G. L. Kaplan
Attorney, Agent, or Firm—William G. Miller, Jr.; Raymond F. MacKay

[57] ABSTRACT

An amperometric measuring system for measuring the concentration of glucose in solution is disclosed. This system uses the enzyme glucose oxidase immobilized on glass beads to convert a continuously drawn sample to hydrogen peroxide and gluconic acid. A flow-through amperometric cell with a small bore flow path is provided to measure the concentration of hydrogen peroxide. The cell includes a cylindrical measuring electrode which carries the sample through its relatively long narrow bore, a counter electrode and a reference electrode interposed between the measuring and counter electrodes with a differential amplifier for automatically adjusting the current between the measuring and counter electrodes to maintain the potential between the measuring and reference electrode at a predetermined value as fed to one input of the amplifier. The current from the measuring electrode is measured as an indication of the concentration of hydrogen peroxide in the solution and hence the glucose concentration.

5 Claims, 3 Drawing Figures

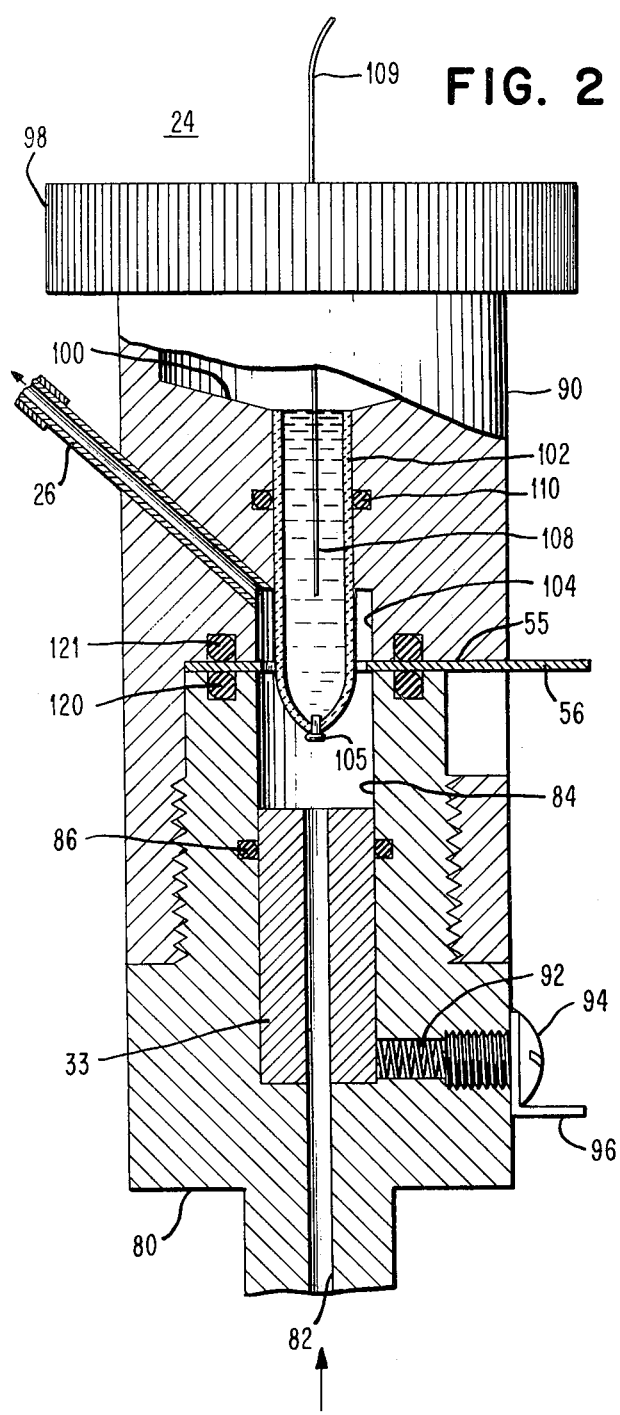
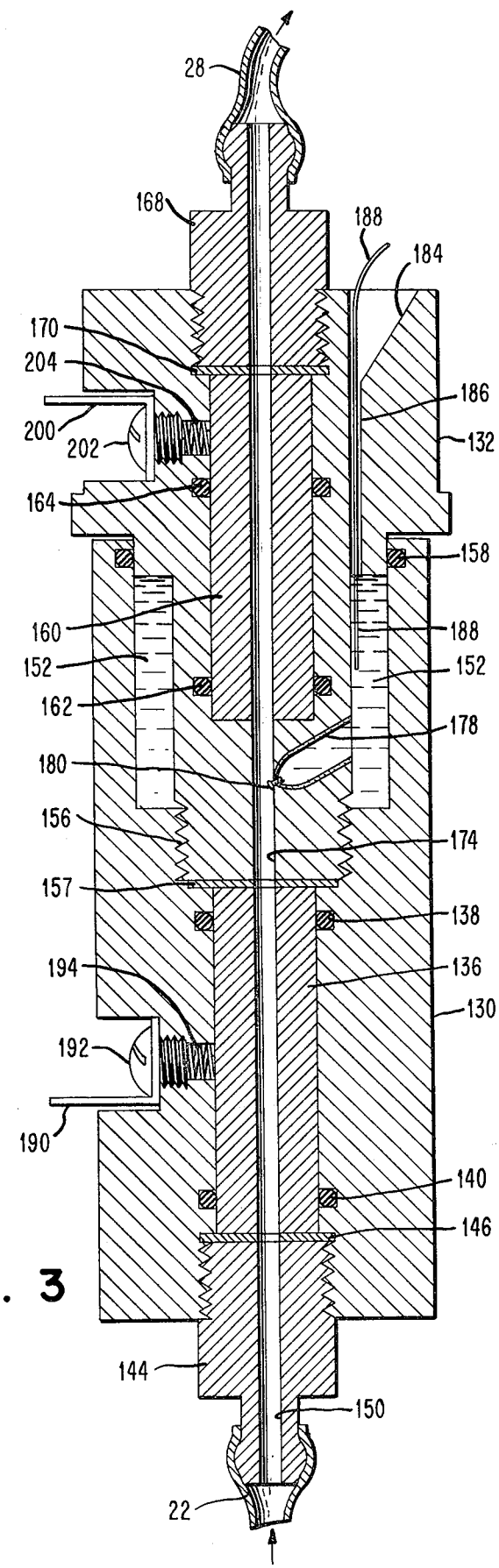

3,902,970

FLOW-THROUGH AMPEROMETRIC MEASURING SYSTEM AND METHOD

BACKGROUND OF THE INVENTION

This invention relates to an apparatus and method for continuously monitoring the concentration of an electroinactive material which is converted by an enzyme reaction to an electroactive material. More particularly, the invention relates to an amperometric measuring system in which a flow-through amperometric cell is utilized for continuously monitoring the concentration of the electroactive material supplied to the amperometric cell at a substantially constant flow rate through a narrow flow path which may be referred to as a small bore path.

A number of methods and apparatus have been described by others for the measuring of the concentration of glucose. The standard chemical methods can, of course, be found in clinical or analytical chemistry textbooks, however, procedures have been published in which glucose oxidase is used for enzymatically converting glucose to form gluconolactone and hydrogen peroxide. The gluconolactone in the presence of water will hydrolize spontaneously to form gluconic acid so that for all practical purposes the products of the conversion are gluconic acid and hydrogen peroxide.

One prior art method for electrochemically measuring the peroxide formed utilizes a cell having a membrane permeable to hydrogen peroxide, for example, but not to the enzyme converting the glucose. The enzyme is in a capillary thin layer between the electrode and the membrane so that at least one electrode system of the cell is responsive to the concentration of hydrogen peroxide and hence to the concentration of glucose.

In other methods the reaction of the enzyme with the glucose is followed by a measurement of the oxygen content of the solution using an oxygen electrode. Still other methods measure the hydrogen peroxide chemically or enzymatically with procedures which require additional reagents and hence additional cost and complexity. Use of the oxygen electrode, for example, requires frequent standardization.

Some of the prior art methods use amperometric cells involving two electrodes which, of course, results in the disadvantage of requiring a large reference electrode to accommodate the necessary current flow.

It is an object of the present invention to provide an improved method and means for continuously monitoring the concentration of substances such as glucose by enzymatically converting that substance to an electroactive substance which can have its concentration constantly monitored by an amperometric cell. More particularly, it is an object of this invention to provide a novel flow-through amperometric cell utilizing three electrodes so that the concentration of electroactive substances, such as hydrogen peroxide, can be continuously monitored and without a large reference electrode being required in the construction of the cell.

SUMMARY OF THE INVENTION

This invention relates to an amperometric measuring method and system for determining the concentration of an electroactive substance. The method can be carried out by apparatus including an electrode system having a measuring electrode with a relatively long dimension along the same flow path but with a small bore, a counter electrode and a reference electrode. The three electrodes are arranged in the flow path of the sample so that the reference electrode and counter electrode are positioned on the same side of the measuring electrode with respect to the flow path. In addition, the apparatus includes feedback means for automatically supplying a current flow between the counter and measuring electrodes so as to maintain a predetermined potential between the reference and measuring electrodes. The resulting current flow is then a measure of the concentration of the electroactive substance in the sample solution.

BRIEF DESCRIPTION OF THE DRAWINGS

In the drawings, FIG. 2 is a detailed diagram of one form which may be used for the amperometric cell of FIG. 1, and FIG. 3 is a detailed diagram of another form which may be used for the amperometric cell of FIG. 1.

DESCRIPTION OF THE PREFERRED EMBDODIMENTS

Figure 1:
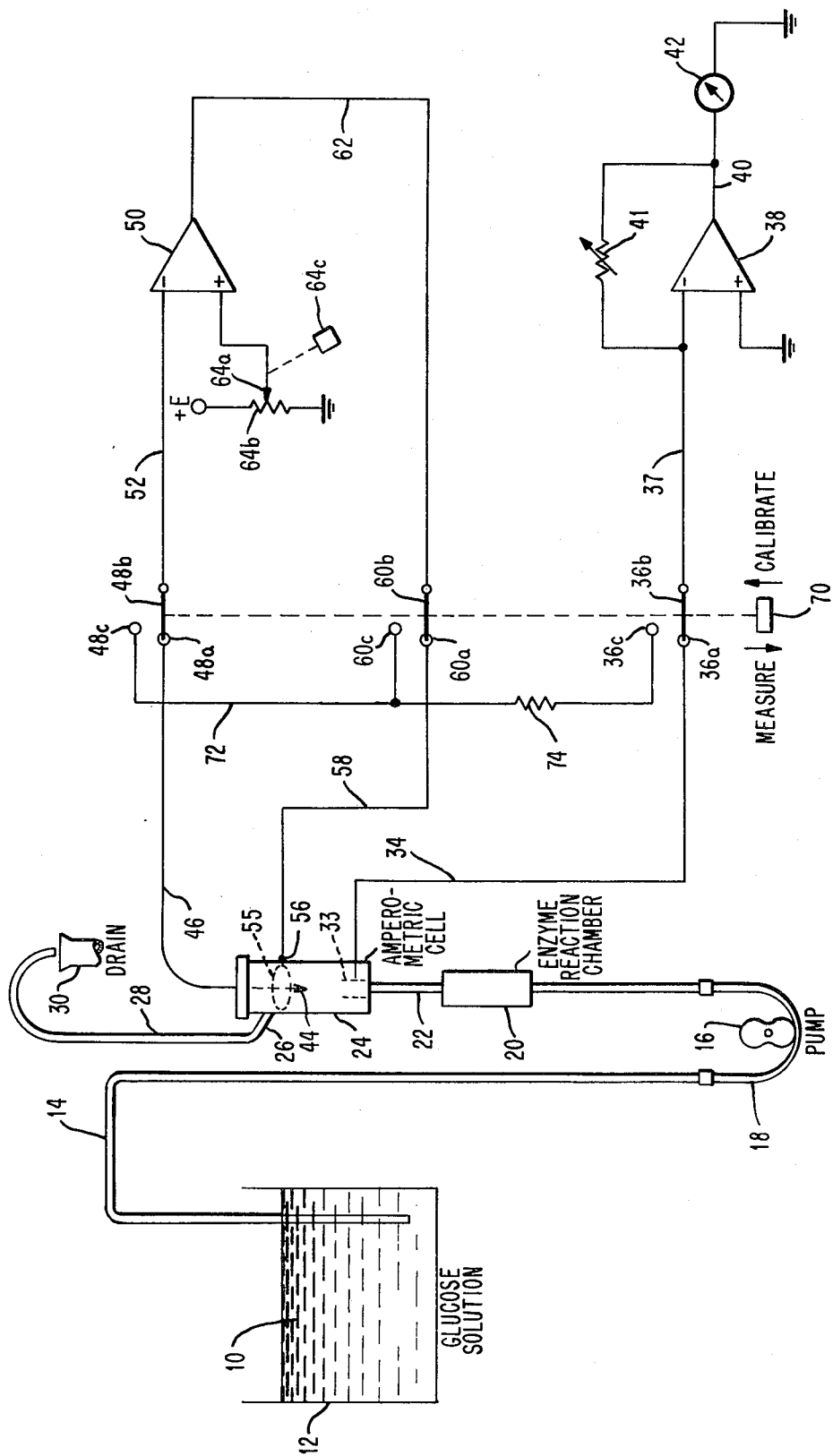
FIG. 1 is a diagram of the sampling and measuring system of the invention as applied to the measurement of the concentration of glucose.

In FIG. 1 the concentration of glucose in the solution 10 held by container 12 is continuously monitored by drawing a continuous sample of the solution from container 12 through the pipe or tubing 14 by means of the pump 16, shown here as a peristaltic pump, which provides a moving reduced cross section of the tubing 18 so that the glucose solution is pumped through that tubing into the enzyme reaction chamber 20 continuously and without coming in contact with materials outside the tubing utilized to transport the solution.

The enzyme reaction chamber is advantageously constructed in the form of a column of packed glass beads which may desirably be of a size on the order of 50 mesh and which are so processed as to have bonded thereto an enzyme such as glucose oxidase. It will be understood that the method for immobilizing enzymes using glass beads has been described by others, as in U.S. Pat. No. 3,519,538, and it will also be understood that the beads may be any of a wide range of sizes depending upon the flow characteristics desired through the reaction chamber.

The enzyme glucose oxidase is effective in the enzyme reaction chamber to completely convert the glucose solution into a solution of gluconic acid and hydrogen peroxide as previously mentioned. That resulting solution is then carried by the tubing or pipe 22 to the inlet of the amperometric cell 24. The solution flows through the amperometric cell to the outlet 26 of the cell and thence by way of the tubing 28 to a drain 30.

By properly controlling the speed of the peristaltic pump 16 a relatively constant flow of glucose solution is maintained and since the enzyme reaction chamber 20 provides for complete conversion for all of the glucose the concentration of hydrogen peroxide in the resulting solution which flows through the cell 24 is directly indicative of the concentration of glucose in the original solution 10.

The amperometric cell 24 contains three electrodes. The first electrode which is passed by the sample solution which flows through the inlet of cell 24 is the measuring electrode, shown symbolically in phantom as a hollow cylinder 33, which is connected by wire 34 to the switch contact 36a which is, during the measurement of the concentration of the electroactive substance in the sample solution, connected by way of the movable contact 36b to a current measuring circuit by way of line 37.

The current measuring circuit in FIG. 1 includes a differential amplifier 38 which has its inverting input connected to line 37 and includes an adjustable feedback resistor 41. The non-inverting input of amplifier 38 is, as shown, connected to ground so that the output on line 40 is effective by way of the voltmeter 42 to indicate the current from electrode 33. The adjustable feedback resistor 41 may be adjusted to determine the current range represented by the calibrations of the meter 42.

After the sample solution has passed the measuring electrode of the cell 24 it then passes the reference electrode shown symbolically in phantom as electrode 44 which is connected by wire 46 to the switch contact 48a which, during the measurement of the solution concentration is connected by the movable contact 48b to the inverting input of amplifier 50 by way of line 52.

After the sample solution has passed the reference electrode (which will be more clearly seen in the description of FIG. 2) the solution then passes the counter electrode, shown symbolically as a ring illustrated in phantom and identified by reference character 55, which has its connector tab 56 connected by way of the wire 58 to the switch contact 60a of a switch whose movable contact 60b normally maintains contact 60a connected to the output of amplifier 50 by way of line 62.

The non-inverting input of amplifier 50 is provided from the movable contact 64a on slidewire 64b so as to provide a predetermined potential as adjusted by the knob 64c. The slidewire 64b is supplied from a potential source +E with the other end of the slidewire being connected to ground. The knob 64c will be adjusted normally so that the potential on the adjustable contact 64a is that potential which is desired between the reference electrode 44 and the measuring electrode 33. Typically, in measuring the concentration of hydrogen peroxide, that potential may be, for example, in the region of 0.6 to 1 volt and to allow adjustability, it may be desirable to have it adjusted to 0.8 volts.

With the movable contacts 36b, 48b, and 60b in the positions shown, with the button 70 in the "measure" position, the amplifier 50 is effective to automatically supply a current flow between the counter electrode 55 and the measuring electrode 33 sufficient to maintain a constant potential between the reference electrode 44 and the measuring electrode 33 equal to that potential set on the sliding contact 64a by the adjustment of knob 64c. The resulting current flowing from the measuring electrode 33 over line 34 is measured by the current measuring circuit and the magnitude of the current is indicated by meter 42. The indication on meter 42 is then an indication of the concentration of hydrogen peroxide in the converted solution in addition to any response due to other electroactive material in the original solution which would produce an offset. That offset, of course, must necessarily be subtracted from the reading of meter 42 to determine the concentration of glucose in the original solution 10.

When the switch button 70 is placed in the "calibrate" position so that the contacts 36b, 48b, and 60b contact the respective upper contacts 36c, 48c, and 60c, the output of amplifier 50 is shorted to its inverting input by line 72 and a calibrating resistor 74 is inserted between the output of amplifier 50 and the input of the current measuring circuit including amplifier 38 to thereby provide a means for indicating on meter 42 the bias voltage at contact 64a for setting that voltage.

In FIG. 2 there is shown by a cross section drawing the details of one form which the amperometric cell 24 may take. The structure of the cell in FIG. 2 includes a cell body made up of two sections. The inlet section 80 is shown with a counterbored inlet passage 82 which is connected to an inner chamber 84 which may also be formed by counterboring. The chamber 84 is of sufficient diameter to receive the measuring electrode 33.

The measuring electrode is preferably made from vitreous carbon in the form of a center bored cylinder 1 inch long and may, for example, have an overall diameter of 3/16 of an inch with the central passage being approximately 1/16 inch in diameter so that the electrode presents a surface to the flowing sample which surface is long with respect to the bore of the cylinder and hence the bore of the flow path. Vitreous carbon has been found to have advantageous characteristics for an amperometric electrode in that it does not have the crystalline structure of pyrolytic carbon and characteristically produces less noise in the signal which it provides. Also, it is completely impervious to water (in that sense being similar to diamond). The vitreous carbon electrode when freshly made is not electrochemically uniformly active. It can, however, be activated to an active state simply by maintaining it at +0.7 to about +4 volts, with respect to the reference electrode, for periods greater than 3 or 4 hours. In the activation procedure a current of about 10 to 100 microamps is maintained while a conductive solution is flowing through the cell. The vitreous carbon electrode is, of course, always maintained at a positive potential during this activation process.

The measuring electrode 33 is shown in FIG. 2 as being held in position by an O-ring 86 which is retained in an annular notch in the chamber 84. The inlet section of the body 80 may be constructed of a plastic material, for example, and is designed to have a threaded portion with male threads for connection of the inlet section with the outlet section 90. It will be noted from FIG. 2 that the measuring electrode 33 is provided with electrical contact to the exterior of the cell 24 by means of the electrically conducting spring 92 which is compressed against the electrode 33 by screw 94 and which makes electrical contact between the electrode 33 and the connector tab 96 held by screw 94.

The outlet section 90 may also be made of a plastic material similar to the inlet section 80 and is shown as having a serrated collar 98 to provide for finger tightening of the inlet and outlet sections. The outlet section 90 is shown with an end chamber 100 which connects with a counterbored section for receiving the reference electrode 102. That counterbored region then connects with a chamber 104 which has a similar diameter to chamber 84 of the inlet section. The reference electrode 102 is shown as a glass electrode which contains a silver chloride solution and which has a liquid junction formed at its active end by a ceramic plug 105. Storage for the silver chloride solution is provided in the chamber 100 and electrical contact with the silver chloride solution is accomplished by the silver wire 108 which may be connected to a copper connecting wire 109 at a junction (not shown) for connection in the circuit of FIG. 1.

The glass electrode 102 is held in its indicated position by means of the O-ring 110 shown as being retained in an annular notch of the counterbore which receives the electrode 102.

The chamber 104 connects with an outlet pipe 26 through a slant bored hole in the outlet section as shown in FIG. 2.

In joining the inlet section 80 and the outlet section 90 to form the complete cell 24 the two sections are conjoined by their respective threaded sections, that is, by the mating of the male threads on the inlet section with the female threads on the outlet section so that there is sandwiched between the two sections a gold counter electrode 55 in the form of a disc with a hole the size of the diameter of chamber 104 and arranged to have a projecting tab 56 to provide for exterior circuit connection. For the purpose of holding the electrode 55 in place and providing a liquid seal upon joining of the sections of the cell, the O-rings 120 and 121 seal against opposite sides of the electrode 55 as the inlet and outlet portions are screwed together.

From the construction of the cell 24 it will be evident that the sample solution flows in the inlet passage formed by the bore 82 through the center bore of the cylindrical measuring electrode 33, past the liquid junction of the reference electrode at plug 105 and then past the counter electrode 55 into the outlet pipe 26. Thus, as pointed out with respect to FIG. 1 the electrodes of the cell are so arranged that both the reference electrode and the counter electrode are on the same side of the measuring electrode with respect to the flow path of the sample. It has been found that it is preferable that the electrodes be arranged in that order in the flow path for proper operation when the current flow between the measuring and counter electrode is automatically adjusted to maintain a predetermined potential between the measuring and reference electrode. It is also preferable for the reference electrode to be as close to the measuring electrode as possible for best linearity.

It will be evident to those skilled in the art that the amperometric cell structure may be varied from that shown in FIG. 2 without departing from the invention here described. One obvious variation involves a change in the configuration of the vitreous carbon electrode shown in FIG. 2 as the measuring electrode. One variation would, of course, be a change in the cross section of the flow path through the electrode. Also, powdered vitreous carbon could be used or thin vitreous carbon rods.

One variation which has been found to be useful is shown in FIG. 3. It differs from the design of FIG. 2 in that the counter and measuring electrodes are both vitreous carbon cylinders like the measuring electrode of FIG. 2. Also, in FIG. 3 the reference electrode is arranged to have its liquid junction at the periphery of the flow path so that the reference electrode presents no obstruction in the flow path. This arrangement avoids the collection of bubbles at the reference electrode.

In FIG. 3 the cell body is made up of two sections, namely, the inlet section 130 and the outlet section 132. The inlet section is shown with its lower part counterbored to receive the measuring electrode 136 so that the electrode is held in place by O-rings 138 and 140 which also act as liquid seals.

The electrode 136 may desirably be of the same size as that indicated for the electrode 33 of FIG. 2 and as mentioned, can likewise be made of vitreous carbon.

The inlet end of the electrode includes the coupling 144 which is arranged to screw into the inlet end of the section 130 and will effectively seal that end by means of packing or a washer 146. The coupling 144 is arranged to accept the inlet tubing 22 and provides a central passage 150 whose diameter corresponds with the bore of the cylindrical electrode 136.

The upper portion of the inlet section 130 is counterbored to form a cavity 152 designed to function in cooperation with the outlet section to form a reservoir for the liquid in the reference electrode, as will be explained.

The outlet section 132 is arranged to form a screw fit with the inlet section 130 by means of the screw threads 156 which cooperate with the packing or washer 157 to provide a sealed coupling therebetween. The outlet and inlet sections are further sealed by the O-ring 158.

As is evident from FIG. 3 the outlet section is counterbored to receive a cylindrical vitreous carbon counter electrode 160 which may typically be of the same size as the measuring electrode 136 and which may be held in the outlet section 132 in a similar fashion as the manner in which the measuring electrode is held in the inlet section, namely, by O-rings 162 and 164.

The outlet end of the section 132 is sealed by the coupling 168 which screws into the outlet section 132 against a packing or washer 170. The coupling 168 is designed to receive the outlet tubing 28 as shown and coupling 168, being similar to coupling 144, has a central passageway of diameter to correspond to the bore of fluid passage in the electrode 160. Likewise, the bore in the outlet section 132 in the region 174 is of the same diameter as the bore of the electrode 160.

In the region 174, between the measuring electrode and the counter electrode, a glass reference electrode 178 is located so its liquid junction 180 is flush with the wall of the counterbore in region 174. The reference electrode 178 may be constructed in a manner similar to that described for the reference electrode 102 of FIG. 2. Thus, the electrode can contain a silver chloride solution and can have a liquid junction at 180 formed by a ceramic plug. The silver chloride solution is retained in the cavity 152 between the inlet and outlet sections and is introduced in the funnel shaped inlet 184 through an inlet passage 186 into the cavity 152. To complete the reference electrode the silver wire 188 is introduced into the reservoir 152 through the inlet passage 186 so as to form the silver/silver chloride reference electrode.

The measuring electrode 136 is provided with an electrical contact exterior to the cell, namely, connector tab 190 which is maintained in contact with the electrode 136 by the screw 192 compressing the spring contact 194 against the electrode 136.

By similar construction the connector tab 200 is maintained in contact with the counter electrode 160 by way of the screw 202 and the contacting spring 204. Thus, to connect the cell of FIG. 3 to the circuit of FIG. 1 the lead 34 of FIG. 1 would be connected to the tab 190 and the lead 58 would be connected to the tab 200 while the wire 188 would be connected to the lead 46 of FIG. 1.

As is the case with the cell construction of FIG. 2 the inlet and outlet sections 130 and 132 may advantageously be constructed of plastic or any other non-conducting materials.

What is claimed is:

1. A method for amperometrically analyzing a sample of a solution of an electroinactive unknown to determine its concentration without using a secondary reagent, comprising the steps of:
   enzymatically converting the inactive unknown by flowing the sample through a bed of beads to which is bonded an enzyme which selectively reacts with said unknown to produce hydrogen peroxide as one byproduct;
   flowing the resulting byproducts through an amperometric cell having:
      a measuring electrode,
      a counter electrode, and
      a reference electrode;
   automatically maintaining a current flow between said measuring and counter electrodes so as to maintain a constant potential between the measuring and reference electrodes; and
   measuring said current flow as an indication of the concentration of hydrogen peroxide in said byproducts and hence the concentration of said electroinactive unknown in said sample solution.

2. The method as set forth in claim 1 in which the reference electrode is positioned so that the counter electrode and the reference electrode are on the same side of the measuring electrode.

3. A measuring system for continuously analyzing a sample of a glucose solution to determine its concentration, comprising:
   means for continuously drawing the sample of said solution;
   means for enzymatically converting the glucose in said solution to hydrogen peroxide and gluconic acid, said means including a flow-through column of beads having the enzyme glucose oxidase immobilized on their surface, said column containing sufficient enzyme to cause the reaction between said enzyme and said glucose to go to completion in said column;
   means for flowing the resulting solution through an amperometric cell which includes:
      a vitreous carbon measuring electrode adapted to be in contact with said resulting solution along the flow path,
      a counter electrode adapted to be in contact with said resulting solution along the flow path, and
      a reference electrode positioned to be in contact with said resulting solution along said path;
   means for automatically maintaining a current flow between said measuring and counter electrodes so as to maintain a constant potential between the measuring and reference electrodes; and
   means for measuring said current flow as an indication of the concentration of hydrogen peroxide produced by said conversion and hence the concentration of glucose in said sample solution.

4. A measuring system for continuously analyzing a sample of a glucose solution to determine its concentration, comprising:
   means for continuously drawing a sample of said solution;
   means for enzymatically converting the glucose in said solution to hydrogen peroxide and gluconic acid, said converting means including a flow-through column of beads having the enzyme glucose oxidase immobilized on their surface so that the column contains sufficient enzyme to cause the reaction between said enzyme and said glucose solution to go to completion in said column;
   means for flowing the resulting solution through an amperometric cell which includes:
      a vitreous carbon measuring electrode adapted to be in contact with said resulting solution,
      a counter electrode adapted to be in contact with said resulting solution, and
      a reference electrode positioned along the flow path to be in contact with said resulting solution so that the measuring electrode is outside an electric current path between the counter electrode and reference electrode;
   means for automatically maintaining a current flow between said measuring and counter electrodes so as to maintain a constant potential between the measuring and reference electrodes; and
   means for measuring said current flow as an indication of the concentration of hydrogen peroxide produced by said conversion and hence the concentration of glucose in said sample solution.

5. A measuring system as set forth in claim 4 in which the reference electrode has a liquid junction formed to be flush with the walls forming the flow path.

* * * * *